US010216556B2

(12) United States Patent
Patel et al.

(10) Patent No.: US 10,216,556 B2
(45) Date of Patent: Feb. 26, 2019

(54) MASTER DATABASE SYNCHRONIZATION FOR MULTIPLE APPLICATIONS

(71) Applicant: SAP SE, Walldorf (DE)

(72) Inventors: Ashutosh Patel, Bangalore (IN); Prithvi Krishna, Bangalore (IN); Mohammed K A Aehthesham, Bangalore (IN); Avinash Permude, Bangalore (IN); Hemanth Rajeswari Anantha, Bangalore (IN)

(73) Assignee: SAP SE, Walldorf (DE)

( * ) Notice: Subject to any disclaimer, the term of this patent is extended or adjusted under 35 U.S.C. 154(b) by 195 days.

(21) Appl. No.: 15/220,843

(22) Filed: Jul. 27, 2016

(65) Prior Publication Data

US 2018/0032434 A1 Feb. 1, 2018

(51) Int. Cl.
*G06F 17/30* (2006.01)
*G06F 11/00* (2006.01)

(52) U.S. Cl.
CPC ........ *G06F 11/00* (2013.01); *G06F 17/30581* (2013.01)

(58) Field of Classification Search
USPC ........................................................ 707/610
See application file for complete search history.

(56) References Cited

U.S. PATENT DOCUMENTS

| 7,529,695 | B2 | 5/2009 | Yang et al. |
| 8,745,096 | B1 | 6/2014 | Noble et al. |
| 9,245,291 | B1 | 1/2016 | Ballaro et al. |
| 2003/0028451 | A1 | 2/2003 | Ananian |
| 2006/0004802 | A1 | 1/2006 | Phillips |
| 2007/0074121 | A1* | 3/2007 | Mullender ............ G06F 9/4443 715/744 |
| 2008/0267386 | A1 | 10/2008 | Cooper |
| 2009/0171999 | A1 | 7/2009 | McColl et al. |
| 2009/0187530 | A1 | 7/2009 | Nair et al. |
| 2009/0198767 | A1* | 8/2009 | Jakobson ........... G01C 21/3679 709/203 |
| 2014/0129577 | A1 | 5/2014 | Young, Jr. et al. |
| 2016/0155203 | A1 | 6/2016 | Gotanda |
| 2016/0179850 | A1 | 6/2016 | Martin et al. |
| 2017/0006135 | A1 | 1/2017 | Siebel et al. |
| 2017/0099313 | A1 | 4/2017 | Singuru |
| 2018/0032553 | A1 | 2/2018 | Patel et al. |

OTHER PUBLICATIONS

"U.S. Appl. No. 15/221,085, Non Final Office Action dated Oct. 5, 2018", 10 pgs.

\* cited by examiner

*Primary Examiner* — Hung T Vy
(74) *Attorney, Agent, or Firm* — Schwegman Lundberg & Woessner, P.A.

(57) ABSTRACT

Example embodiments for master data synchronization for multiple applications are described. In an example embodiment, master data to be employed by a plurality of applications, as well as schema for the master data, are accessed. One or more publication requests to store the master data and the schema of the master data to a master data store accessible by the plurality of applications are generated. The schema may be cached locally to one or more of the applications.

20 Claims, 11 Drawing Sheets

MASTER DATABASE SYNCHRONIZATION FOR MULTIPLE APPLICATIONS

FIELD

The present application relates generally to data processing and, more specifically in an example embodiment, to master database synchronization for multiple applications.

BACKGROUND

Oftentimes, a single set of data, such as master data maintained in a master database, is employed by multiple applications that perform varying tasks using the same, similar, or different portions of that same data. Due to the different tasks performed by each of the applications, each application may incorporate that same data into its own database in some manner. Additionally, each application may enhance or augment its particular version of the master data with additional data for specific processes or tasks performed by that application.

In many environments, the master data is not completely static in nature, but instead changes over time. Moreover, not only may the specific data values represented in the master data change, but the overall structure or "schema" of the data may change as well. Such changes typically result in each individual application updating its own particular database to reflect the changes in the master data. Further, such changes may occur at different times from one application to another, possibly resulting in a lack of synchronization of the changes among the applications.

BRIEF DESCRIPTION OF DRAWINGS

The present disclosure is illustrated by way of example and not limitation in the figures of the accompanying drawings, in which like references indicate similar elements.

DETAILED DESCRIPTION

In the following description, for purposes of explanation, numerous specific details are set forth to provide an understanding of various example embodiments of the present subject matter. It will be evident, however, to those skilled in the art, that example embodiments of the present subject matter may be practiced without these specific details.

Figure 1:
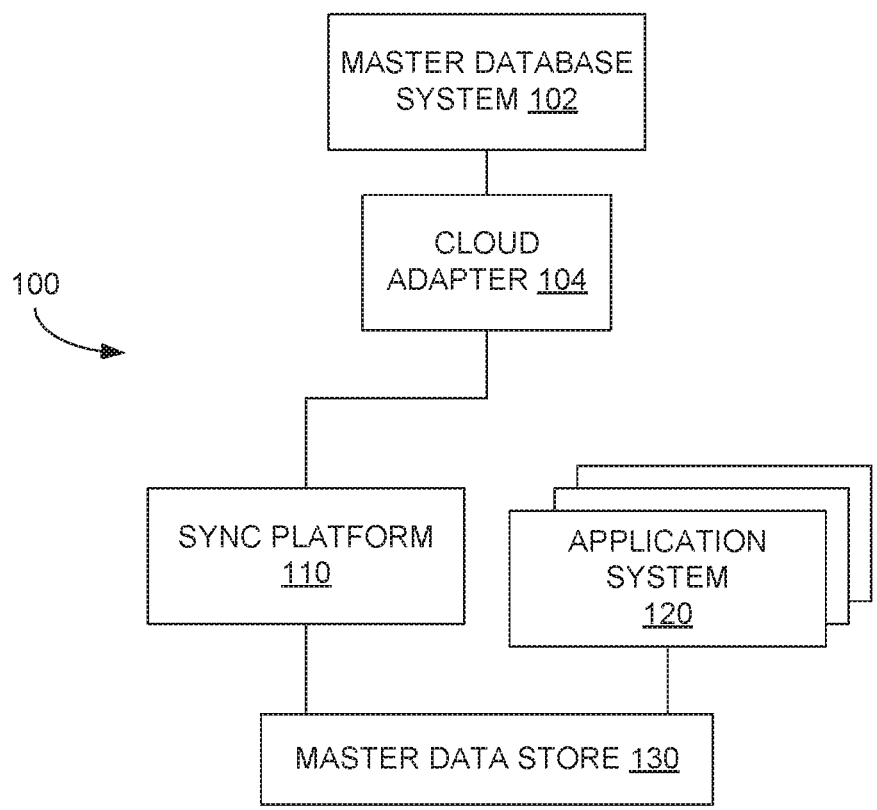
FIG. 1 is a block diagram of an example master data synchronization system.

FIG. 1 is a block diagram of an example master data synchronization system 100. As shown, the master data synchronization system 100 may include a master database system 102, a cloud adapter 104, a synchronization platform 110, a plurality of application systems 120, and a master data store 130. One or more of the various components of the master data synchronization system 100 depicted in FIG. 1 may be, or may be hosted on, one or more computer or server systems, such as the computer processing system 1100 described below in conjunction with FIG. 11.

Moreover, various portions of the master data synchronization system 100 may be communicatively intercoupled by way of a communication network, such as a wide area network (WAN) (e.g., the Internet), a wireless WAN (WWAN), a local area network (LAN), a wireless LAN (WLAN), a cellular data network (e.g., a third-generation (3G) or fourth-generation (4G) network), another communication connection, and/or combinations thereof. In one example embodiment, the cloud adapter 104 is communicatively coupled to the synchronization platform 110 by way of a network that carries messages from the cloud adapter 104 to the synchronization platform 110.

The master database system 102 may be a database system that stores or contains master data to be employed in the execution or operation of one or more of the application systems 120. In one example embodiment, master data may be any data that is employed or utilized by multiple applications, such as those that may execute on the application systems 120. In a more specific example embodiment, master data may be data representing objects or items that are employed in various aspects of an enterprise. Such master data may include data describing products, spare components, raw materials, and so on. Other types of master data, such as vendor master data (e.g., legal entity name, tax identification information, contact information, and the like), market master data, and/or so forth may also serve as master data. In yet other example embodiments, the master data may represent any data relating to any topic (e.g., sports, science, engineering, entertainment, news events, and so on) to be shared and employed by multiple applications executing on the application systems 120. One example of the master database system 102 may be an enterprise resource planning system.

The master data stored in the master database system 102 may contain a number of fields holding various numerical, Boolean, text, or other values. The size, structure, and/or interrelationships of these fields may vary from one type of master data to the next. Generally, the information describing these and other aspects of the master data may be referred to as "schema" or metadata for the master data. The master database system 102, from time to time, may alter either or both of the master data and the schema of the master data. Such alterations may be based on changes imposed on, or detected within or external to, the master database system 102. The master database system 102 may operate as a relational database, object-oriented database, or any other collection of data organized according to a particular schema.

The application systems 120 may execute one or more applications that employ the master data held or maintained by the master database system 102. In the example in which the master data is material master data or other enterprise-related data, the application systems 120 may execute applications that automate the sourcing of materials, the formation of contracts relating to those materials, and the like. More generally, the applications may include one or both of "upstream" applications (e.g., higher-level applications, such as sourcing, contract management, and analytics) and "downstream" applications (e.g., lower-level applications for managing individual transactions and other specific interactions with suppliers).

Generally, in the master data synchronization system 100 of FIG. 1, the master database system 102 may provide the master data and associated schema via the cloud adapter 104 to the synchronization platform 110. The synchronization platform 110, in turn, may cause the master data and schema to be stored in the master data store 130. The application systems 120 may then access the master data and schema at the master data store 130, which may serve as a "single point of truth" for the master data and associated schema for the application systems 120. In addition, the master data and/or associated schema may be enhanced or augmented beyond that stored in the master database system 102 to provide greater functionality or flexibility in the operation of the applications executing on the application systems 120.

In an example embodiment, the synchronization platform 110 may also cause the application systems 120 to store or cache a local copy of the schema for the master data locally from the master data store 130, while the applications systems 120 access the master data from the master data store 130 without caching the master data locally. In an example embodiment, caching the schema, but not the master data, allows repeated use of the schema by the application systems 120 without consuming an inordinate amount of resources of the master data store 130, while also facilitating less frequent access to the master store data, which may change more frequently than the associated schema, thus reducing the possible benefits of caching the master data at the application systems 120. The synchronization platform is described in greater depth below with respect to FIG. 4.

The cloud adapter 104 may be configured to access or retrieve the master data and/or associated schema from the master database system 102, and process the data and/or schema for transmission to the synchronization platform 110. In one example, the cloud adapter 104 presents this information as one or more messages transmitted over a network to the synchronization platform 110, which may then process the information for storage in the master data store 130. The synchronization platform 110 may also enhance or augment the master data and/or schema for the use of the application systems 120, as mentioned above. The cloud adapter 104 is discussed in greater detail below in reference to FIG. 3.

The master data store 130 may be any database storage system that receives and stores, or "publishes," the master data, as well as the schema and/or other metadata associated with the master data, received from the synchronization platform 110. In some example embodiments, the master data store 130 may also index the master data and/or the related schema, such as by way of generating indexing information to facilitate faster or more efficient searching of the master data and schema by the application systems 120. Moreover, the master data store 130 may operate as an in-memory database in some example embodiments, thus further expediting the searching and maintenance of the master data and associated schema. Details regarding the master data store 130 are described below in conjunction with FIG. 2.

Each of the application systems 120 may execute one or more of the applications that utilized the master data and schema of the master data store 130. In other example embodiments, a single application system 120 may execute the multiple applications. Examples of the application systems 120 are discussed briefly in conjunction with FIG. 2.

Consequently, in at least some example embodiments, the master data synchronization system 100 may provide, by way of the synchronization platform 110 and the master data store 130, a centralized system for the near-real-time presentation and maintenance of master data and associated schema sourced by a master data source (e.g., the master database system 102), even when changes are imposed upon the master data and/or schema by the master data source from time to time, Further, the master data synchronization system 100 may enhance or augment the master data and/or schema for the specific purposes of the application systems 120 to increase the usability of the master data while maintaining consistency with the master data stored at the master data source. Other possible benefits may result from application of the various aspects of the master data synchronization system 100 discussed below.

Figure 2:
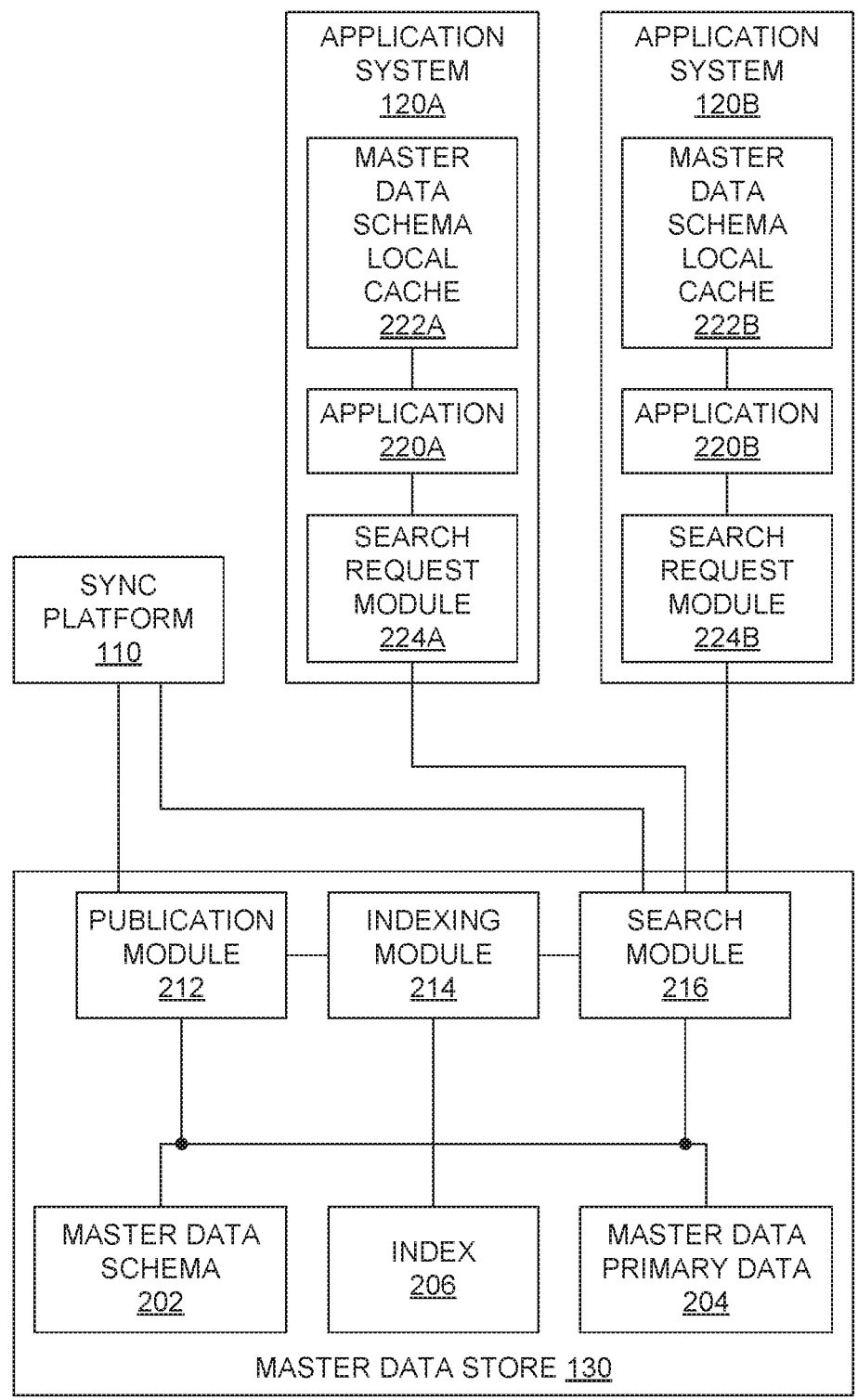
FIG. 2 is a block diagram of an example master data store and example applications systems of the example master data synchronization system of FIG. 1.

FIG. 2 is a block diagram of example embodiments of the master data store 130 and the application systems 120 of the master data synchronization system of FIG. 1. In an example embodiment, the master data store 130 may include a publication module 212, an indexing module 214, a search module 216, master data primary data 204 (e.g., the master data), master data schema 202 (e.g., the schema for the master data primary data 204), and an index 206. As indicated in FIG. 2, the publication module 212 may receive commands or requests from the synchronization platform 110 to publish (e.g., store for subsequent access) the master data schema 202 and the master data primary data 204. Further, in conjunction with the publication module 212 storing the master data schema 202 and the master data primary data 204, the publication module 212 may cause the indexing module 214 to generate the index 206 to facilitate faster and/or more efficient searching of the stored master data schema 202 and/or the master data primary data 204. The search module 216, in response to search requests from the synchronization platform 110 and/or the application systems 120 (e.g., the applications systems 120A and 120B depicted in FIG. 2), may search for particular values or fields of the master data schema 202 and/or the master data primary data 204. While the index 206 is depicted separately from the master data schema 202 and the master data primary data 204 in FIG. 2, the index 206 may be distributed among various columns or other structures of the master data schema 202 and the master data primary data 204 in some example embodiments.

Each of the publication module 212, the indexing module 214, and the search module 216, as well as other modules and similar components described herein, may be implemented as hardware components, software or firmware components executed by a hardware processor of a computing system, or some combination thereof.

Also as illustrated in FIG. 2, the application systems 120A and 120B may each include a corresponding application 220A, 220B that accesses and uses the master data schema 202 and the master data primary data 204. While FIG. 2 illustrates the presence of two application systems 120A, 12013, each hosting a single application 220A, 220B, more than two application systems 120 may be employed in other example embodiments, and one or more application systems 120 may host more than one application 220. As shown, each of the applications 220A, 220B accesses the master data store 130 by way of a corresponding search request module 224A, 224B that issues search requests to the search module 216 of the master data store 130. In other example embodiments, the applications 220A, 220B, as well as the synchronization platform 110, may access the master data schema 202 and/or the master data primary data 204 more directly without the assistance of the search module 216 as part of the normal operation of the application 220A, 220B.

Also, each application system 120A, 120B may include a master data schema local cache 222A, 222B. In an example embodiment, the application system 120A, 120B may access the master data store 130 to retrieve the master data schema 202, or a portion thereof, and store the retrieved master data schema 202 in the master data schema local cache 222A, 222B. Consequently, the application 220A, 220B, during normal operation, may access any desired master data schema from the local cache 222A, 222B and may access the master data primary data 204 directly from the master data store 130 without caching that data locally. As is described later with respect to FIG. 8, the synchronization platform 110 may invalidate the local cache 222A, 222B in response to updating the master data schema 202 in the master data store 130.

Figure 3:
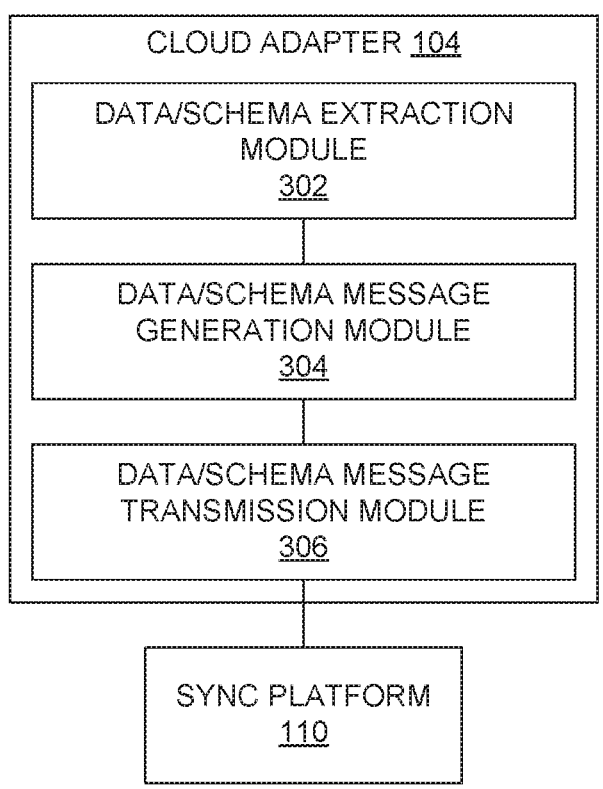
FIG. 3 is a block diagram of an example cloud adapter of the example master data synchronization system of FIG. 1.

FIG. 3 is a block diagram of an example embodiment of the cloud adapter 104 of the master data synchronization system 100 of FIG. 1. The cloud adapter 104 may include a data/schema extraction module 302, a data/schema message generation module 304, and a data/schema message transmission module 306. Accordingly, the cloud adapter 104 may be configured to extract the master (primary) data and associated schema from the master database system 102, generate one or more messages that include the master data and associated schema that have been extracted, and transmit those messages to the synchronization platform 110.

In an example embodiment, the data/schema extraction module 302 may extract the master data, as well as the schema and/or metadata associated with the master data, from the master database system 102. The extraction may take the form of database accesses or queries issued to the master database system 102, direct memory accesses of the maker database system 102, and/or other extraction methods. Further, the data/schema extraction module 302 may extract only those schema and/or data that the master database system 102 has changed or altered. In other example embodiments, the data/schema extraction module 302 may extract all of the master data and related schema for all master data records employed by one or more of the application systems 120, such as on a periodic basis.

The data/schema message generation module 304 may process the extracted master data and/or schema to generate one or more messages for transmission to the synchronization platform 110. In an example embodiment, the data/schema message generation module 304 converts the extracted master data and schema into one or more comma-separated value (CSV) tiles. For example, one or more CSV files may contain the schema, while one or more other CSV files may contain the master (primary) data. Further, each CSV file may contain the master data or schema for one or more specific master data types. The data/schema message generation module 304 may compress the one or more CSV files, such as by way of storing the CSV files into a "zipped" file. The data/schema message generation module 304 may also encode the resulting files, such as by way of a binary-to-text encoding scheme (e.g., Base64). The resulting files may then be placed in a message, possibly along with a file map that denotes the names of the various files stored inside the zipped file, possibly along with a set of operations (e.g., load, delete, and so on) to be performed for each of the various master data records included in the message. Other information, such as the identity of the master database system 102, may also be included in the message. In yet other example embodiments, the data/schema message generation module 304 may process and/or package the master data and associated schema, or portions thereof, using various other methods.

The data/schema message transmission module 306 may be configured to transmit the message according to a particular communication standard or protocol to the synchronization platform 110. In an example embodiment, the message is transmitted over a FileChannel using a text-based peer-to-peer tile sharing protocol (e.g., Direct Connect). However, many other types of message transmission schemes and protocols may be employed in other examples to transfer the message from the cloud adapter 104 to the synchronization platform 110.

Figure 4:
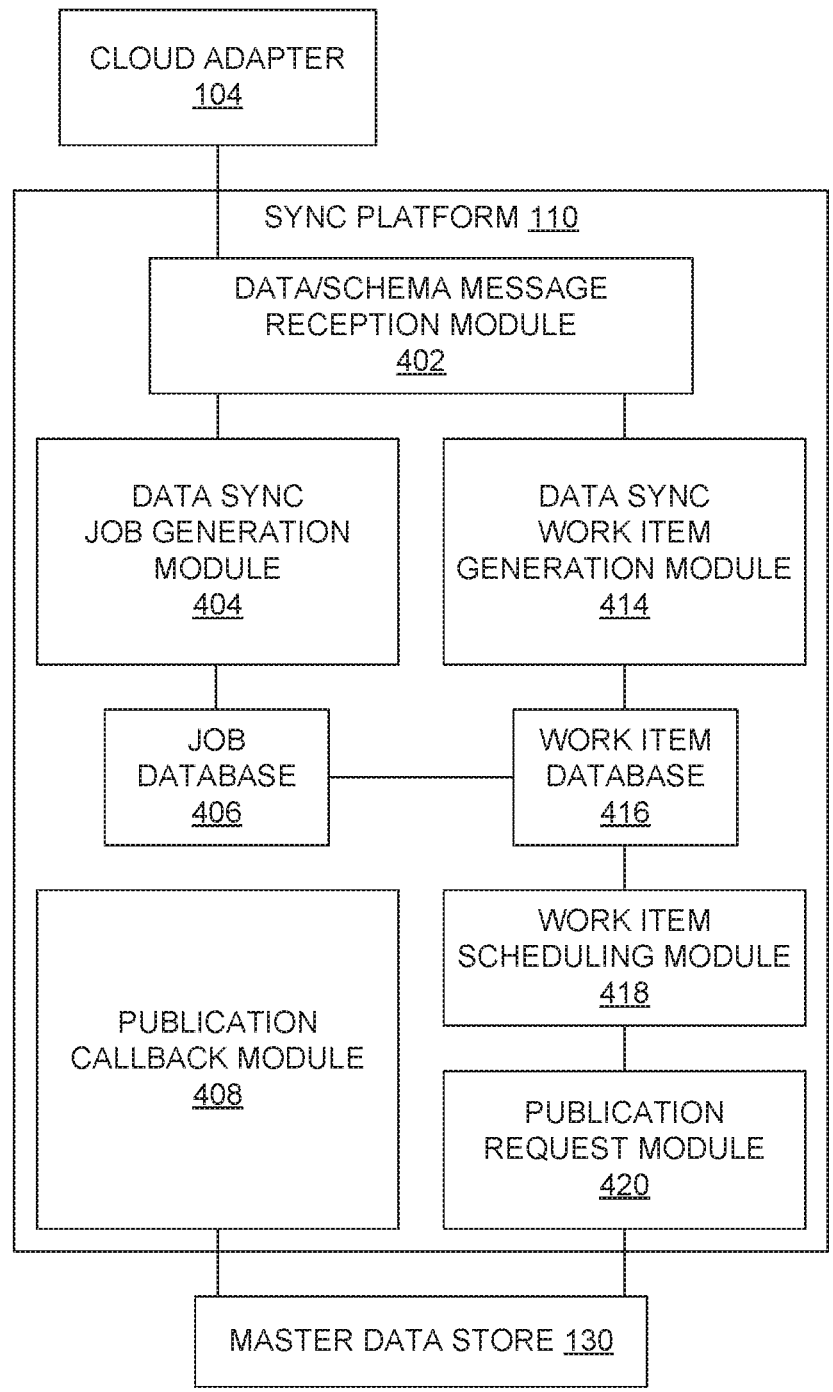
FIG. 4 is a block diagram of an example synchronization platform of the example master data synchronization system of FIG. 1.

FIG. 4 is a block diagram of an example embodiment of the synchronization platform 110 of the master data synchronization system 100 of FIG. 1. The synchronization platform 110 may include a data/schema message reception module 402, a data synchronization job generation module 404, a job database 406, a publication callback module 408, a data synchronization work item generation module 414 a work item database 416, a work item scheduling module 418, and a publication request module 420. Other or different modules aside from those depicted in FIG. 4 may be implemented in other example embodiments of the synchronization platform 110.

The data/schema message reception module 402 may be configured to receive the one or more messages from the cloud adapter 104 discussed above. In response to receiving the message, the data/schema message reception module 402 may initiate operation of the data synchronization job generation module 404 and/or the data synchronization work item generation module 414. In one example embodiment, the data/schema message reception module 402 may initiate a single job to be generated by the data synchronization job generation module 404, as well as one or more work items to be generated by the data synchronization work item generation module 414. In an example embodiment, the data/schema message reception module 402 may also perform some processing of the received message, such as removal of header information or other communication overhead included in the message, message decoding, and/or other message processing.

The data synchronization job generation module 404 may be configured to store the master data and/or associated schema in the job database 406 as a binary large object (BLOB). Such data may be stored as files, such as the files stored in the received message, as described earlier. In addition, the data synchronization job generation module 404 may perform any file "upzipping," decompression, or similar processing prior to the storing of the master data and associated schema.

The data synchronization work item generation module 414 may be configured to generate one or more work items for each message received (or job generated) and store those work items in the work item database 416. In an example embodiment, each work item may be associated with a particular portion of master data or schema, such as a master data record or plurality of records, to be published to the master data store 130.

The work item scheduling module 418 may be configured to retrieve each work item stored in the work item database 416, possibly in serial fashion, and schedule each work item for publication by the publication request module 420. In an example embodiment, the work item scheduling module 418 may throttle, or control the timing of, the publication requests, and may also retry one or more work items that have failed. The work item scheduling module 418 may also purge work items that have not been processed successfully within some predetermined time period.

The publication request module 420 may issue each work item received from the work item scheduling module 418 as one or more publication requests to the master data store 130. In one example embodiment, the publication request module 420 may provide one or more "callbacks" within one or more of the publication requests. A callback may be, in at least some example embodiments, a procedure call, a section of executable code, or the like passed as an argument to the master data store 130 as part of a publication request. In one example embodiment, the callback may be a uniform resource locator (URL), to which the master data store 130 sends a request, such as a Hypertext Transfer Protocol (HTTP) request.

Figure 5:
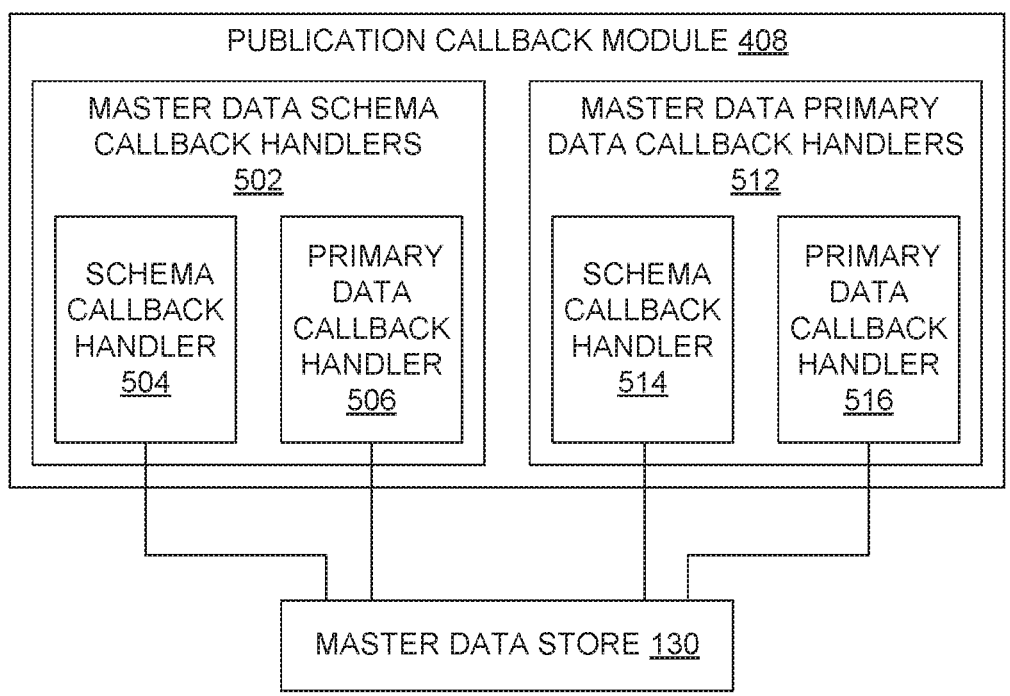
FIG. 5 is a block diagram of an example publication callback module of the example synchronization platform of FIG. 4.

In association with the operation of the publication request module 420, the publication callback module 408 may provide the functionality for each callback initiated by the master data store 130 by way of one or more callback handlers. FIG. 5 is a block diagram of an example embodiment of the publication callback module 408 of the synchronization platform 110 of FIG. 4. As depicted, the publication callback module 408 may include master data schema callback handlers 502 and master data primary data callback handlers 512. More specifically the master data schema callback handlers 502 may include a schema callback handler 504 and a primary data callback handler 506, and the master data primary data callback handlers 512 may include a schema callback handler 514 and a primary data callback handler 516. Since both master data and the associated schema for the master data are stored in the master data store 130, each of these types of data is stored and referenced in the master data store 130 according to its own schema: a schema for the master data primary data 204, and a schema for the master data schema 202. Accordingly, the primary data and associated schema for each of the master data and the master data schema may be associated with a separate callback handler 504, 506, 514, and 516.

The schema callback handler 504, in response to a callback from the master data store 130 associated with a publication request for master data schema 202, may query the master data store 130 to retrieve the schema used to store the master data schema 202 in the master data store 130. In other example embodiments, the schema for the master data schema 202 may be retrieved using other methods. Subsequent to the callback to the schema callback handler 504, the master data store 130 may issue a callback to the primary data callback handler 506. In response, the primary data callback handler 506 may employ the schema previously retrieved for the master data schema 202 to process the associated master data schema 202 previously stored in a BLOB in the job database 406 and to transmit the processed schema to the master data store 130 for publication. In the example embodiment in which the master data schema 202 is stored in one or more CSV files, as mentioned above, the primary data callback handler 506 may convert or translate the primary data for the master data schema 202 from CSV format to a second format recognized by the master data store 130. An example of the second format may be an Extensible Markup Language (XML) format, a format related to XML (e.g., Ariba® Meta Language, or AML), or another data format. Moreover, the primary data callback handler 506 may further process the reformatted master data schema 202 for transmission to the master data store 130. In an example embodiment, the primary data callback handler 506 may serialize the reformatted master data schema 202 into one or more files or messages, such as by way of Apache™ Avro®. Alternative formatting, repackaging, and/or associated functions may be utilized on the master data schema in other example embodiments.

In an example embodiment, prior to processing and transmitting the master data schema 202 for publication in the master data store 130, the publication request module 420 may first determine if the schema for the master data received from the cloud adapter 104 and residing in the job database 406 is different from the schema currently stored in the master data store 130. In such an example embodiment, the publication request module 420 may retrieve the current master data schema 202, or a portion thereof, from the master data store 130 and compare that schema 202 with the reformatted schema stored in the job database 406. If the two schemas are different, the publication request module 420 may proceed with causing the publication of the new schema from the job database 406, as described above. In addition, after successful publication of the schema, the publication request module 420 may cause any copies of the current master data schema 202 that are cached locally to the application systems 120 to be invalidated, thus influencing the application systems 120 to retrieve the new schema from the master data store 130. If, instead, the two schemas are the same, the publication request module 420 may terminate the work items associated with the publication of the new schema. A more specific discussion of the comparing of the two schemas is discussed below in connection with FIG. 8.

Additionally, the schema callback handler 504, in some example embodiments, may augment the master data schema 202 using information, such additional metadata, provided on behalf of one or more of the applications 220 executed on the application systems 120. Such information may include information that is common to all of the applications 220, as well as information that is specific to one or more applications 220. Such information may render the master data more useful for the applications, such as associating various properties of a user interface presented by an application 220, facilitating validation of data used in the applications (e.g., data entered by a user via the user interface), and so on. More specifics regarding master data schema augmentation are discussed below with reference to FIGS. 9 and 10.

In an example embodiment, for publication requests involving the master data primary data 204, the schema callback handler 514 for the master data primary data 204 may query the master data store 130 for the schema associated with the particular master data type to which the particular master data primary data 204 belongs. A subsequent related callback to the primary data callback handler 516 for the master data primary data 204 may then employ the schema previously retrieved for the master data primary data 204 to process the associated master data primary data 204 stored in a BLOB in the job database 406 and to transmit the processed primary data to the master data store 130 for publication. In one example embodiment in which the master data primary data 204 is stored in one or more CSV files, as mentioned above, the primary data callback handler 516 may convert or translate the master data primary data 204 from CSV format to a second format recognized by the master data store 130. In an example embodiment, the primary data callback handler 516 may serialize the reformatted master data primary data 204 into one or more files or messages by way of Apache™ Avro®, included in the Apache™ Hadoop® distributed computing software library. However, other formatting, repackaging, and/or associated functions may be utilized on the master data primary data 204 in other example embodiments.

Figure 6:
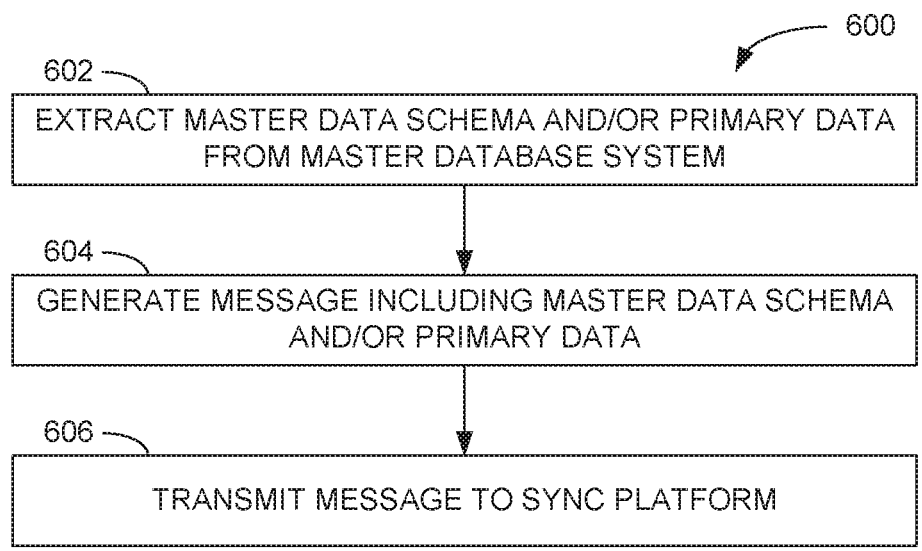
FIG. 6 is a flow diagram of an example method performed by the example cloud adapter of FIG. 3.

FIG. 6 is a flow diagram of an example method 600 performed by the cloud adapter 104 of FIG. 3. While the method 600 is described in conjunction with the cloud adapter 104 and its modules 302-306, other components or modules may be employed to perform the same or similar operations in other embodiments. In the method 600, the data/schema extraction module 302 may extract master data schema and/or primary data from the master database system 102 (operation 602). The data/schema message generation module 304 may generate one or more messages including the master data schema 202 and/or master data primary data 204 extracted from the master database system 102 (operation 604). The data/schema message transmission module 306 may then transmit the generated message to the synchronization platform 110 (operation 606). Details regarding various example embodiments of these operations 602-606 are presented in the discussion provided above in conjunction with FIG. 3.

Figure 7:
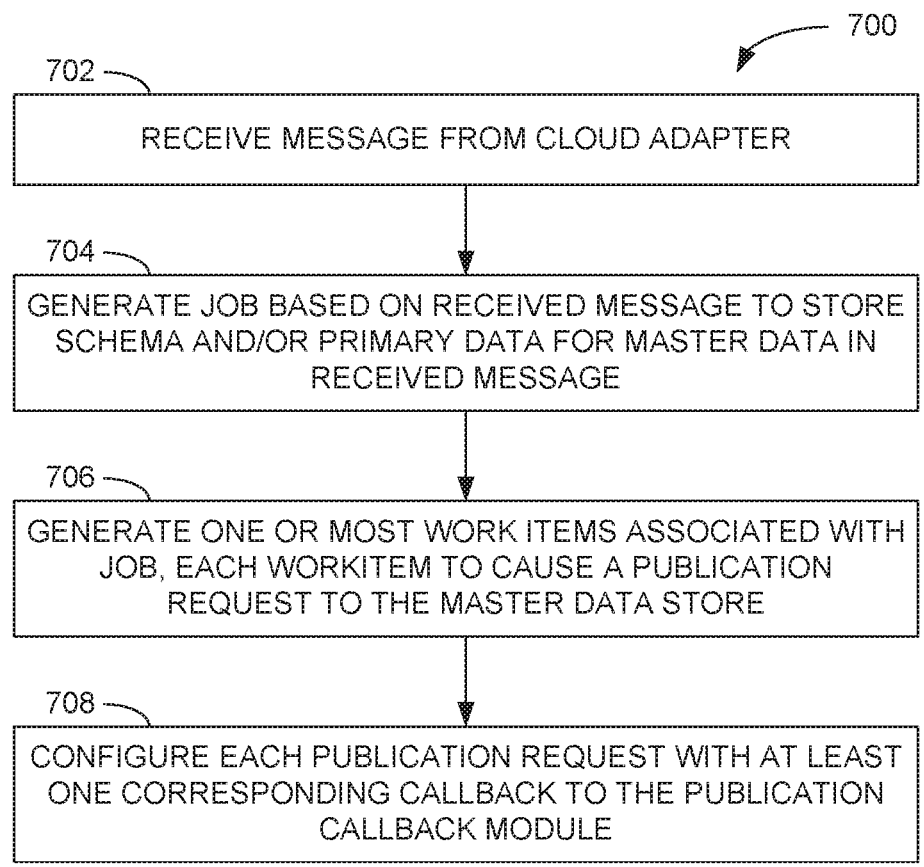
FIG. 7 is a flow diagram of an example method performed by the example synchronization platform of FIG. 4.

FIG. 7 is a flow diagram of an example method 700 performed by the example synchronization platform 110 of FIG. 4. While the method 700 is described in connection with the synchronization platform 110 and its modules 402-420, other components or modules may be employed to perform the same or similar operations in other embodiments. In the method 700, the data/schema message reception module 402 may receive a message from the cloud adapter 104 (operation 702). The data synchronization job generation module 404 may generate a job based on the received message to store schema and/or primary data for the master data from the received message in the job database 406 (operation 704). Also based on the received message, the data synchronization work item generation module 414 may generate one or more work items associated with the job and store the work items in the work item database 416 (operation 706), with each work item to cause the issuance of one or more publication requests to the master data store 130 via the publication request module 420. The publication request module 420 may configure one or more of the publication requests with one or more corresponding callbacks (operation 708), with those callbacks being handled by the publication callback module 408. More details regarding example embodiments of these operations 702-708 are presented in the discussion provided above in conjunction with FIG. 4.

Figure 8:
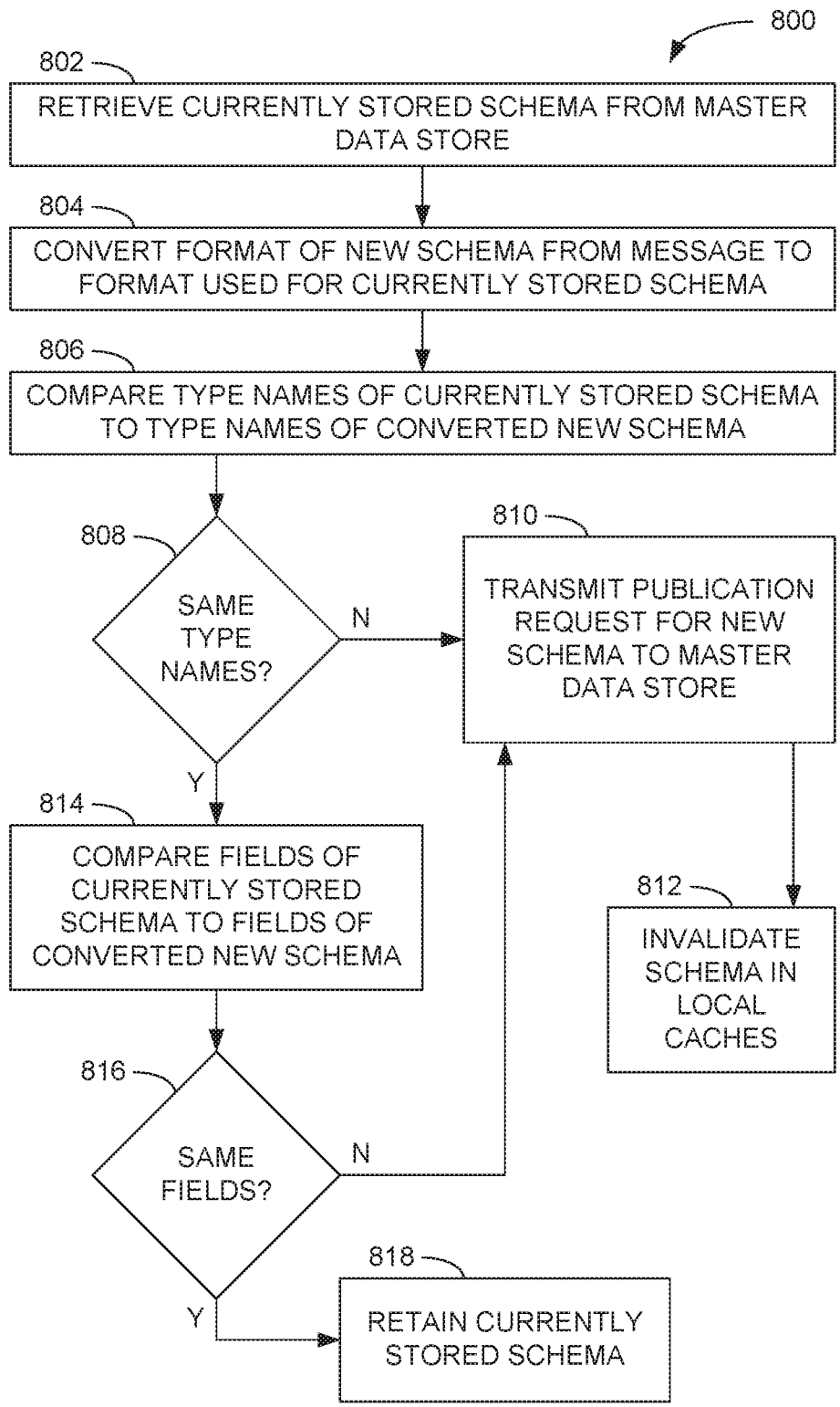
FIG. 8 is a flow diagram of an example method performed by an example schema callback handler of the example publication callback module of FIG. 5.

FIG. 8 is a flow diagram of an example method 800 performed by example embodiments of the primary data callback handler 506 of the publication callback module 408 of FIGS. 4 and 5, as well as the publication request module 420 of FIG. 4. While the method 800 is described in connection with the primary data callback handler 506 and the publication request module 420, other components may be employed to perform the same operations in other embodiments. In the method 800, the primary data callback handler 506 may retrieve the primary data of the schema currently stored in the master data store 130 (operation 802). The schema callback handler 504 may also convert the format of the new schema stored in the job database 406 into the format used for the currently stored schema from the master data store 130 (operation 804). The primary data callback handler 506 may then compare data type names of the currently stored schema from the master data store 130 to the data type names of the converted new schema from the job database 406 (operation 806). If the same data type names are not used in both schemas (operation 808), the publication request module 420 may cause the transmission of one or more publication requests for the new schema stored in the job database 406 to the master data store 130 (operation 810). In addition, if at least one of the application systems 120 has stored the current schema from the master data store 130 in a master data schema local cache 222, the publication request module 420 may cause invalidation of the local caches 222 (operation 812).

If, instead, the same data type names are used in both schemas (operation 808), the publication request module 420 may then compare the fields, as well as the properties of those fields, of the currently stored schema from the master data store 130 to the corresponding fields and associated properties of the converted new schema stored in the job database 406 (operation 814). If the fields and associated properties of the two schemas are not the same (operation 816), the publication request module 420 may then cause a transmission of one or more publication requests for the new schema to the master data store 130 (operation 810), and possibly initiate invalidation of the one or more local caches 222 (operation 812). If instead, the fields and related properties of the two schemas are the same (operation 816), the publication request module 420 may ignore the new schema and retain the schema currently stored in the master data store 130 (operation 818). In an example embodiment, the publication request module 420 may cause the one or more work items associated with the new schema, as well as the related job, to be terminated.

In some example embodiments, the publication request module 420 may implement the two-level comparison approach illustrated in FIG. 8 to expedite the determination as to whether the newly received schema is different from the currently stored schema in the master data store 130 before proceeding with publication of the new schema. More specifically, by first performing the relatively quick operation of comparing the data type names of the two schemas, the publication request module 420 may quickly detect a difference in the two schemas to warrant publication of the new schema. If the data type names are the same, the publication request module 420 then proceeds to the possibly more time-consuming task of comparing the various fields, and properties thereof, of the schema to finally determine whether publication of the new schema is warranted.

Figure 9:
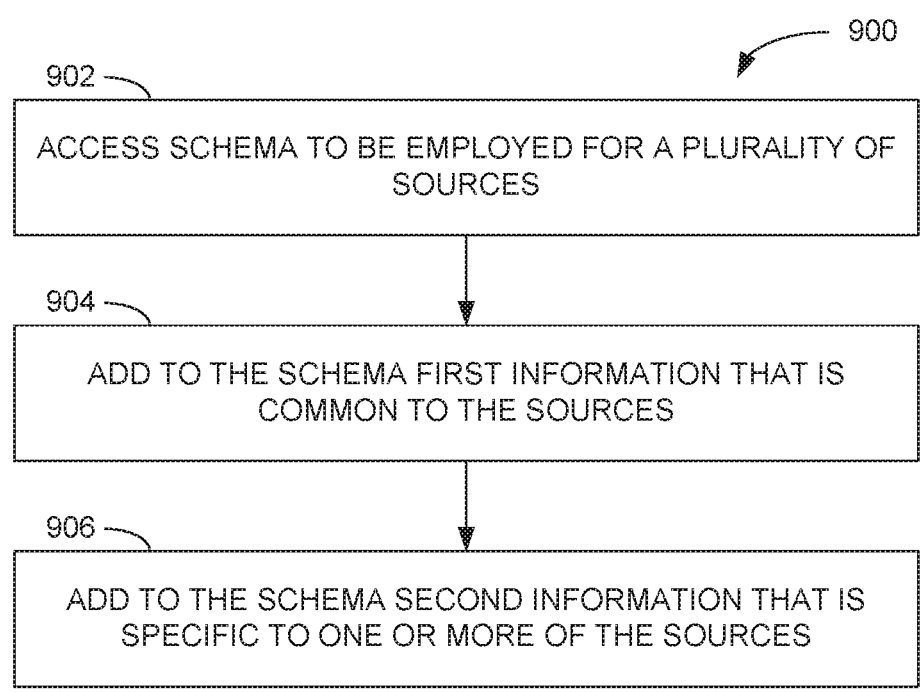
FIG. 9 is a flow diagram of an example method of augmenting a database schema using information from multiple sources.

FIG. 9 is a flow diagram of an example method 900 of augmenting database schema (e.g., master data schema) using information from multiple sources. In this example embodiment, the multiple sources may be applications (e.g., the applications 220 of FIG. 2), or sources that operate on behalf of the applications. However, other sources of information for augmenting database schema are also contemplated.

In the method 900, schema to be employed for a plurality of sources is accessed (operation 902). First information or metadata that is common to the sources is added to the schema (operation 904). Thereafter, second information that is specific to one or more of the sources is added to the schema (operation 906). Consequently, a schema may be generated that serves the needs of each of the sources that will be accessing the schema and associated data.

Figure 10:
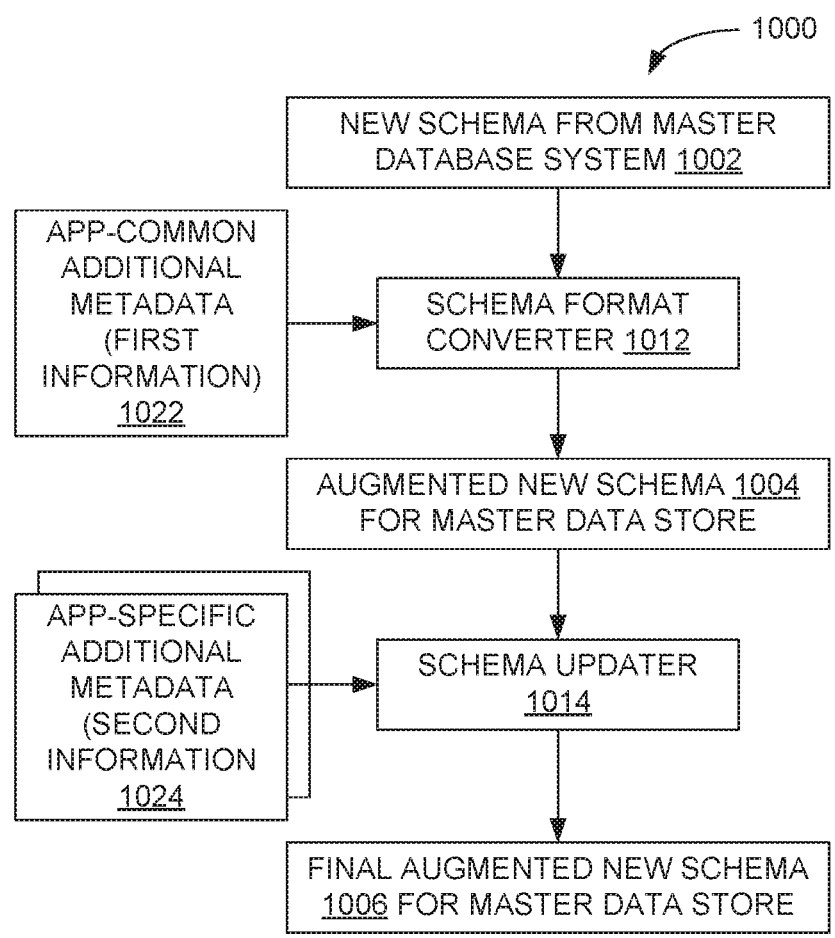
FIG. 10 is a dataflow diagram of a system for augmenting master data schema using information from multiple applications.

FIG. 10 is a dataflow diagram of a system 1000 for augmenting master data schema using information from multiple applications (e.g., the applications 220 of FIG. 2). While the system 1000 is described herein within the environment of the master data synchronization system 100 and its various components, aspects of the system 1000 may be applied in other environments as well. More specifically, while the publication request module 420 or another component of the synchronization platform 110 may serve as a schema format converter 1012 and/or a schema updater 1014, as described more fully below, other devices or systems not discussed herein may serve as these components 1012, 1014 in other environments. Moreover, while the system 1000 is applied herein to schema for master data (e.g., material master data), the system 1000 may be applied to other types of database data that may be considered master data by virtue of its use among multiple applications or systems.

In the system 1000, a schema format converter 1012 may convert master data schema 1002 (e.g., new master data schema received from the master database system 102 via the cloud adapter 104 and stored in the job database 406, as described above) from a first format (e.g., a CSV file format) to a second format (e.g., an XML-based format employed in the master data store 130).

In conjunction with the conversion of the master data schema 1002, the schema format converter 1012 may also add incorporate the master data schema first information 1022, or application-common additional metadata 1022, that is common to the applications 220 to the master data schema 1002 to augment the new schema. The schema format converter 1012 may add the first information 1022 during the conversion of the schema 1002, after the conversion of the schema 1002, or at some other point in time. In an example embodiment, the first information may denote or mark a field of the master data schema 1002 as a lookup field, or may denote or mark multi-locale fields as vector fields. For example, a lookup field or a vector field may facilitate data entry by a user via a user interface of an application 220, such as by providing a list of multiple values from which a user may select to fill a particular field, thus reducing possible data entry errors. The resulting augmented master data schema 1004, in some example embodiments, may then be stored in the master data store 130, such as by way of the publication requests described above. The storing of the augmented master data schema 1004 may be performed by the schema callback handler 504 of FIG. 5 in an example embodiment.

Thereafter, a schema updater 1014 may add or incorporate second information 1024, or application-specific additional metadata 1024, that is specific to each of one or more applications 220 to the schema 1004 stored in the master data store 130. For example, the first application 220A may provide a first set of second information 1024, while a second application 220B may provide a second set of second information 1024, each of which is added to the augmented new master data schema 1004. In an example embodiment, the second information 102.4 may be used by the one or more applications 220 to associate properties controls, search result field, and labels) of a user interface it provides with one or more portions of the new schema. Further, the second information 1024 may be utilized by the one or more applications 220 to validate data being entered or received relative to the master data via that application. In an example embodiment, each application 220 may employ the updated schema based on the application-specific additional metadata 1024 to generate "flex" master data classes to allow the application 220 to provide unique application-specific views of the master data to a user of the application 220. Moreover, in some example embodiments, each application system 120 or application 220 may employ its own application-side class generator to create its own classes to access the master data via its own second information 1024.

In some example embodiments, one or both the first information 1022 and the second information 1024 may be represented as an XML-based format that matches the second format to which the new master data schema was transformed.

To add the first information 1020 and/or the second information 1024, "hooks" or "hook points" may be provided to access and add that information to the master data schema. Generally, a hook may be software that allows customization or alteration of program behavior using code or data presented externally to the software providing the hook. In an example embodiment, the schema format converter 1012 may access a first configuration file that includes references to one or more files (e.g., XML-based static files) that include the first information 1022. Accordingly, during format conversion, the schema format converter 1012 accesses the one or more files holding the first information 1022 via the first configuration file, reads the first information 1022, and adds that information to the schema. Similarly, the schema updater 1014 may provide a second hook that accesses a second configuration file that references the second information 1024 for each of the applications 220 to update the schema accordingly. In an example embodiment, indexing within the master data store 130 may occur between the adding of the application-common additional metadata 1022 and the adding of the application-specific additional metadata 1024. Consequently, indexing in the master data store 130 may only occur for portions of the schema that include the application-common additional metadata 1022, and not for the portions of the schema resulting from the addition of the application-specific additional metadata 1024.

In an example embodiment, an apparatus for master data synchronization comprises a hardware processor and a memory having stored therein instructions that, when executed by the hardware processor, cause the apparatus to perform operations comprising accessing master data from a master data source, the master data to be employed by a plurality of applications, accessing schema of the master data from the master data source, the schema of the master data to be employed by the plurality of applications, generating one or more publication requests to store the master data and the schema of the master data to a master data store accessible by the plurality of applications, and causing the schema of the master data stored in the master data store to be cached locally to a first application of the plurality of applications for access by the first application, the plurality of applications to access the master data from the master data store.

In another example embodiment, including all previous example embodiments, the operations further comprise retrieving a current version of the schema of the master data from the master data store, and comparing the accessed schema of the master data to the current version of the schema of the master data retrieved from the master data store, wherein the generating of the one or more publication requests occurs in response to the accessed schema of the master data being different from the current version of the schema of the master data.

In another example embodiment, including all previous example embodiments, the comparing of the accessed schema of the master data to the current version of the schema of the master data comprises comparing first type names of the accessed schema of the master data to second type names of the current version of the schema of the master data, and comparing, in response to the first type names being the same as the second type names, first fields and properties of the first fields of the accessed schema of the master data to second fields and properties of the second fields of the current version of the schema of the master data, wherein the generating of the one or more publication requests occurs in response to at least one difference between the first type names and the second type names or at least one difference between the first fields and the properties of the first fields, and the second fields and the properties of the second fields.

In another example embodiment, including all previous example embodiments, the operations further comprise causing, in response to the generating of the one or more publication requests, an invalidation of a copy of a current version of the schema of the master data cached locally to the first application.

In another example embodiment, including all previous example embodiments, the master data source comprises an enterprise resource planning system, and the master data comprises material master data.

In another example embodiment, including all previous example embodiments, the plurality of applications comprise a material sourcing application.

In another example embodiment, including all previous example embodiments, the operations further comprise incorporating additional schema to the schema of the master data based on additional metadata corresponding to the plurality of applications.

In another example embodiment, including all previous example embodiments, the incorporating of the additional schema comprises incorporating first additional information to the schema of the master data based on first additional metadata common to the plurality of applications, and incorporating second additional information to the schema of the master data based on second additional metadata specific to one of the plurality of applications.

In another example embodiment, including all previous example embodiments, the incorporating of the first additional information occurs prior to the storing of the schema of the metadata in the master data store, and the incorporating of the second additional information occurs after the storing of the schema of the metadata in the master data store.

In another example embodiment, including all previous example embodiments, the accessing of the master data and the accessing of the schema of the master data comprise receiving a message comprising at least one of the master data or the schema of the master data using a peer-to-peer file sharing protocol.

In another example embodiment, including all previous example embodiments, the message comprises a compressed file including a plurality of files including the at least one of the master data or the schema of the master data.

In another example embodiment, including all previous example embodiments, the plurality of files comprises a comma-separated value file.

In another example embodiment, including all previous example embodiments, the accessing of the schema of the master data comprises receiving a message comprising the schema of the master data, the schema of the master data being received into a memory-mapped portion of a data memory as a binary large object.

In another example embodiment, including all previous example embodiments, the operations further comprise parsing the binary large object to generate a serialized version of the schema of the master data, and providing the serialized version of the schema of the master data to the master data store in response to a callback called by the master data store in response to the one or more publication requests.

In an example embodiment, a method of synchronizing master data comprises accessing master data from a master data source, the master data to be employed by a plurality of applications, accessing schema of the master data from the master data source, the schema of the master data to be employed by the plurality of applications, generating, using at least one hardware processor of a machine, one or more publication requests to store the master data and the schema of the master data to a master data store accessible by the plurality of applications, and causing the schema of the master data stored in the master data store to be cached locally to a first application of the plurality of applications for access by the first application, the plurality of applications to access the master data from the master data store.

In another example embodiment, including all previous example embodiments, the method further comprises retrieving a current version of the schema of the master data from the master data store, and comparing the accessed schema of the master data to the current version of the schema of the master data retrieved from the master data store, wherein the generating of the one or more publication requests occurs in response to the accessed schema of the master data being different from the current version of the schema of the master data, and wherein the method further comprises invalidating, in response to the generating of the one or more publication requests, a cached copy of the current version of the schema of the master data stored locally to the first application.

In an example embodiment, a non-transitory computer-readable medium comprises instructions that, when executed by a hardware processor of a machine, cause the machine to perform operations comprising accessing master data from a master data source, the master data to be employed by a plurality of applications, accessing schema of the master data from the master data source, the schema of the master data to be employed by the plurality of applications, generating one or more publication requests to store the master data and the schema of the master data to a master data store accessible by the plurality of applications, and causing the schema of the master data stored in the master data store to be cached locally to a first application of the plurality of applications for access by the first application, the plurality of applications to access the master data from the master data store.

In another example embodiment, including all previous example embodiments, the operations further comprise causing, in response to the generating of the one or more publication requests, invalidation of a copy of the schema of the master data cached locally to the first application.

In another example embodiment, including all previous example embodiments, the accessing of the schema of the master data comprises receiving a message comprising a plurality of files including the schema of the master data, the operations further comprising storing the plurality of files as a binary large object.

In another example embodiment, including all previous example embodiments, at least one of the one or more publication requests comprises a callback to be called by the master data store to parse the plurality of files into a serialized version of the schema of the master data.

Figure 11:
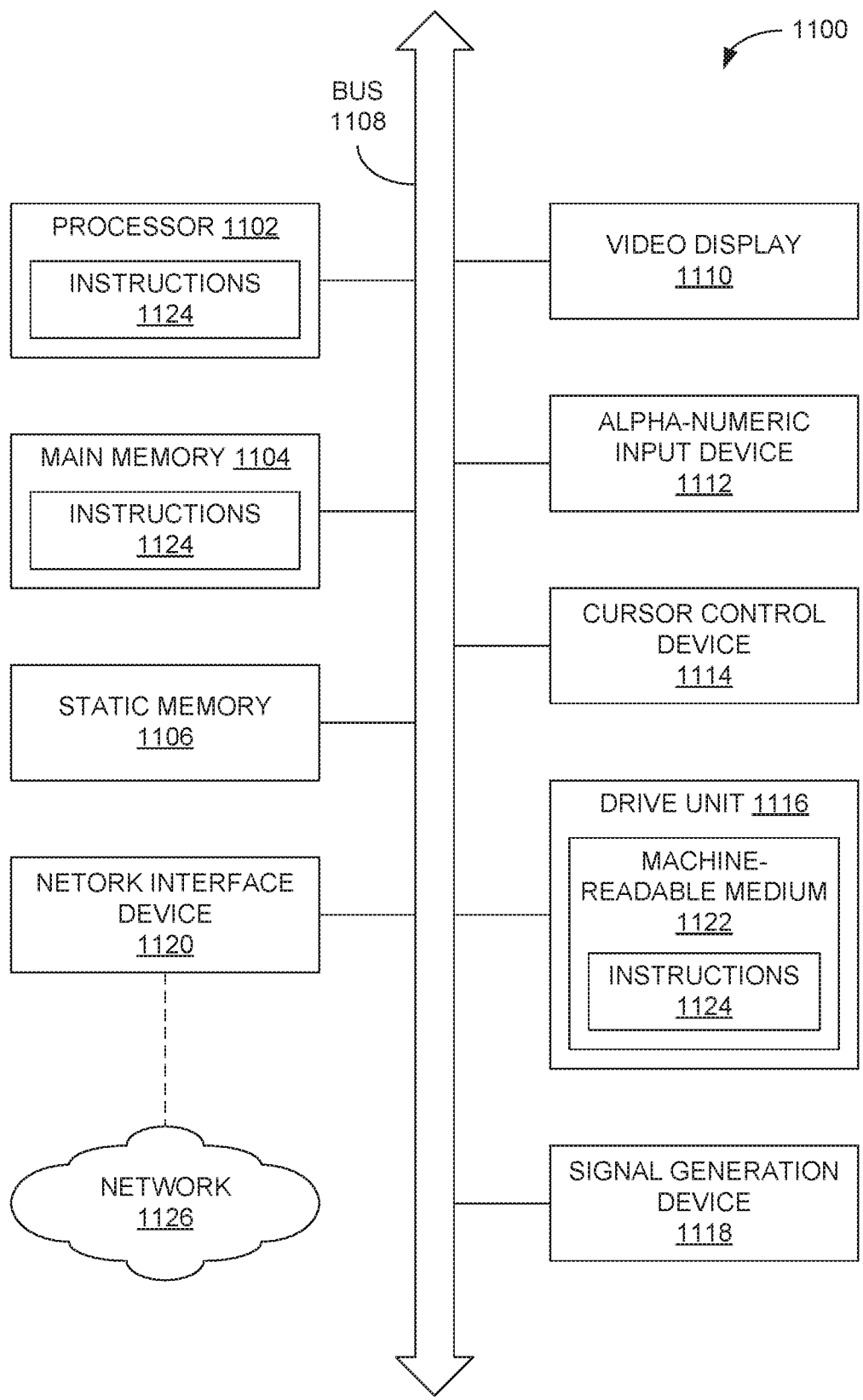
FIG. 11 is a block diagram of a computer processing system within which a set of instructions may be executed for causing a computer to perform any one or more of the methodologies discussed herein.

FIG. 11 is a block diagram of a computer processing system 1100 within which a set of instructions 1124 may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also be deployed, for example, by software-as-a-service (SaaS), application service provider (ASP), or by utility computing providers. The computer may be a server computer, a personal computer (PC), a tablet PC, a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 1100 includes a processor 1102 (e.g., a central processing unit (CPU), a graphics processing unit (GM), or both), a main memory 1104, and a static memory 1106, which communicate with each other via a bus 1108. The computer processing system 1100 may further include a video display 1110 (e.g., a plasma display, a liquid crystal display (LCD), or a cathode ray tube (CRT)). The computer processing system 1100 also includes an alphanumeric input device 1112 (e.g., a keyboard), a user interface (UI) cursor control device 1114 (e.g., a mouse and/or touch screen), a drive unit 1116, a signal generation device 1118 (e.g., a speaker), and a network interface device 1120.

The drive unit 1116 includes a machine-readable medium 1122 on which is stored one or more sets of instructions 1124 and data structures embodying or utilized by any one or more of the methodologies or functions described herein. The instructions 1124 may also reside, completely or at least partially, within the main memory 1104, the static memory 1106, and/or within the processor 1102 during execution thereof by the computer processing system 1100, the main memory 1104, the static memory 1106, and the processor 1102 also constituting tangible machine-readable media 1122.

The instructions 1124 may further be transmitted or received over a network 1126 via the network interface device 1120 utilizing any one of a number of well-known transfer protocols (e.g., Hypertext Transfer Protocol).

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions 1124. The term "machine-readable medium" shall also be taken to include any medium that is capable of storing, encoding, or carrying a set of instructions 1124 for execution by the computer and that cause the computer to perform any one or more of the methodologies of the present application, or that is capable of storing, encoding, or carrying data structures utilized by or associated with such a set of instructions 1124. The term "machine-readable medium" shall accordingly be taken to include, but not be limited to, solid-state memories and optical and magnetic media.

While the example embodiments discussed herein are described with reference to various implementations and exploitations, these example embodiments are illustrative, and the scope of the disclosure is not so limited. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are possible and may fall within a scope of various embodiments of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements fall within a scope of embodiments of the present disclosure as represented by the appended claims.

What is claimed is:

1. An apparatus comprising:
   a hardware processor; and
   a memory having stored therein instructions that, when executed by the hardware processor, cause the apparatus to perform operations for reducing resources consumed by a first application of a plurality of applications when accessing a master data store, the operations comprising:
   accessing master data from a master data source, the master data to be employed by the plurality of applications;
   accessing schema of the master data from the master data source, the schema of the master data to be employed by the plurality of applications;
   generating one or more publication requests to store the master data and the schema of the master data to a master data store accessible by the plurality of applications; and
   causing the schema of the master data stored in the master data store to be stored in a local cache of a first application of the plurality of applications for access by the first application, the causing of the schema to be stored in the local cache allowing the application to access the schema without consuming resources of the master data store.

2. The apparatus of claim 1, the operations further comprising:
   retrieving a current version of the schema of the master data from the master data store; and
   comparing the accessed schema of the master data to the current version of the schema of the master data retrieved from the master data store;
   wherein the generating of the one or more publication requests occurs in response to the accessed schema of the master data being different from the current version of the schema of the master data.

3. The apparatus of claim 2, the comparing of the accessed schema of the master data to the current version of the schema of the master data comprising:
 comparing first type names of the accessed schema of the master data to second type names of the current version of the schema of the master data; and
 comparing, in response to the first type names being the same as the second type names, first fields and properties of the first fields of the accessed schema of the master data to second fields and properties of the second fields of the current version of the schema of the master data;
 wherein the generating of the one or more publication requests occurs in response to at least one difference between the first type names and the second type names or at least one difference between the first fields and the properties of the first fields, and the second fields and the properties of the second fields.

4. The apparatus of claim 1, the operations further comprising:
 causing, in response to the generating of the one or more publication requests, an invalidation of a copy of a current version of the schema of the master data stored in the local cache of the first application.

5. The apparatus of claim 1, the master data source comprising an enterprise resource planning system, and the master data comprising material master data.

6. The apparatus of claim 1, the plurality of applications comprising a material sourcing application.

7. The apparatus of claim 1, the operations further comprising:
 incorporating additional schema to the schema of the master data based on additional metadata corresponding to the plurality of applications.

8. The apparatus of claim 7, the incorporating of the additional schema comprising:
 incorporating first additional information to the schema of the master data based on first additional metadata common to the plurality of applications; and
 incorporating second additional information to the schema of the master data based on second additional metadata specific to one of the plurality of applications.

9. The apparatus of claim 8, the incorporating of the first additional information occurring prior to the storing of the schema of the metadata in the master data store, and the incorporating of the second additional information occurring after the storing of the schema of the metadata in the master data store.

10. The apparatus of claim 1, the accessing of the master data and the accessing of the schema of the master data comprising receiving a message comprising at least one of the master data or the schema of the master data using a peer-to-peer file sharing protocol.

11. The apparatus of claim 10, the message comprising a compressed file including a plurality of files including the at least one of the master data or the schema of the master data.

12. The apparatus of claim 11, the plurality of files comprising a comma-separated value file.

13. The apparatus of claim 1, the accessing of the schema of the master data comprising receiving a message comprising the schema of the master data, the schema of the master data being received into a memory-mapped portion of a data memory as a binary large object.

14. The apparatus of claim 13, the operations further comprising:
 parsing the binary large object to generate a serialized version of the schema of the master data; and
 providing the serialized version of the schema of the master data to the master data store in response to a callback called by the master data store in response to the one or more publication requests.

15. A method comprising:
performing operations for reducing resources consumed by a first application of a plurality of applications when accessing a master data store, the operations comprising:
 accessing, using a hardware processor, master data from a master data source, the master data to be employed by the plurality of applications;
 accessing, using the hardware processor, schema of the master data from the master data source, the schema of the master data to be employed by the plurality of applications;
 generating, using the hardware processor, one or more publication requests to store the master data and the schema of the master data to a master data store accessible by the plurality of applications; and
 causing, using the hardware processor, the schema of the master data stored in the master data store to be stored in a local cache of a first application of the plurality of applications for access by the first application, the causing of the schema to be stored in the local cache allowing the application to access the schema without consuming resources of the master data store.

16. The method of claim 15, further comprising:
 retrieving a current version of the schema of the master data from the master data store; and
 comparing the accessed schema of the master data to the current version of the schema of the master data retrieved from the master data store;
 wherein the generating of the one or more publication requests occurs in response to the accessed schema of the master data being different from the current version of the schema of the master data; and
 wherein the method further comprises invalidating, in response to the generating of the one or more publication requests, a cached copy of the current version of the schema of the master data stored in the local cache of the first application.

17. A non-transitory computer-readable medium comprising instructions that, when executed by a hardware processor of a machine, cause the machine to perform operations for reducing resources consumed by a first application of a plurality of applications when accessing a master data store, the operations comprising:
 accessing master data from a master data source, the master data to be employed by a plurality of applications;
 accessing schema of the master data from the master data source, the schema of the master data to be employed by the plurality of applications;
 generating one or more publication requests to store the master data and the schema of the master data to a master data store accessible by the plurality of applications; and
 causing the schema of the master data stored in the master data store to be stored in a local cache of a first application of the plurality of applications for access by the first application, the causing of the schema to be stored in the local cache allowing the application to access the schema without consuming resources of the master data store.

18. The non-transitory computer-readable medium of claim 17, the operations further comprising:

causing, in response to the generating of the one or more publication requests, invalidation of a copy of the schema of the master data stored in a local cache of the first application.

19. The non-transitory computer-readable medium of claim 17, the accessing of the schema of the master data comprising receiving a message comprising a plurality of files including the schema of the master data, the operations further comprising storing the plurality of files as a binary large object.

20. The non-transitory computer-readable medium of claim 19, wherein at least one of the one or more publication requests comprises a callback to be called by the master data store to parse the plurality of files into a serialized version of the schema of the master data.

* * * * *